(12) United States Patent
Lee

(10) Patent No.: US 6,595,735 B1
(45) Date of Patent: Jul. 22, 2003

(54) BULK PARTICULATE DISCHARGE APPARATUS AND METHOD

(75) Inventor: Charles Lee, Shipston-on-Stour (GB)

(73) Assignee: Matcon (R&D) Limited, Glos (GB)

( * ) Notice: Subject to any disclaimer, the term of this patent is extended or adjusted under 35 U.S.C. 154(b) by 0 days.

(21) Appl. No.: 09/601,564

(22) PCT Filed: Dec. 3, 1999

(86) PCT No.: PCT/GB99/04057
§ 371 (c)(1),
(2), (4) Date: Oct. 23, 2000

(87) PCT Pub. No.: WO00/34163
PCT Pub. Date: Jun. 15, 2000

(30) Foreign Application Priority Data

Dec. 4, 1998 (GB) .............................................. 9826803
May 25, 1999 (GB) .............................................. 9912172

(51) Int. Cl.⁷ ................................................ B65G 1/00
(52) U.S. Cl. ...................... 414/292; 414/199; 414/204; 406/132; 406/137
(58) Field of Search ........................... 406/26, 50, 113, 406/130, 132, 137, 197, 181.1, 520; 222/636; 414/199, 204, 292, 299

(56) References Cited

U.S. PATENT DOCUMENTS

| | | | | |
|---|---|---|---|---|
| 2,958,161 A | * | 11/1960 | Palmer | 432/13 |
| 4,022,512 A | * | 5/1977 | Autelli | 302/26 |
| 4,470,524 A | * | 9/1984 | Semenenko | 222/196 |
| 4,850,751 A | * | 7/1989 | Federhen et al. | 406/127 |
| 5,017,053 A | * | 5/1991 | Sisk | 406/138 |
| 5,775,544 A | * | 7/1998 | Semenenko | 222/181.1 |
| 5,893,567 A | * | 4/1999 | Bitterli | 277/646 |

FOREIGN PATENT DOCUMENTS

| | | | | |
|---|---|---|---|---|
| EP | 0 384 826 A1 | * | 8/1990 | B65D/90/66 |
| FR | 2 696 725 | * | 4/1994 | B65G/65/30 |
| WO | WO 98/43902 | * | 10/1998 | B65G/69/18 |
| WO | WO 98/46505 | * | 10/1998 | B65G/69/18 |

* cited by examiner

Primary Examiner—Joseph A. Dillon
(74) Attorney, Agent, or Firm—Alix, Yale & Ristas, LLP

(57) ABSTRACT

A bulk particulate handling apparatus and method for transferring material between a first and second site which utilizes a stream of gas to remove material from the flow path. Contamination of the flow-path is thereby reduced by providing the stream of gas for the removal of material before and after flow of material. A method embodied by the invention is directed toward the use of a bulk particulate handling apparatus.

28 Claims, 3 Drawing Sheets

BULK PARTICULATE DISCHARGE APPARATUS AND METHOD

The invention relates to apparatus and a method for handling transfer of material, and in particular to handling transfer of flowable particulate material.

Many industries, such as the food and pharmaceutical industries produce products in the form of flowable particulate material. This can be for example, powder, dust, grains, pellets, tablets and capsules. Such material often has to be transferred from one place to another, and special apparatus is used for this purpose, due to the quantities and characteristics of the products involved. Product can be stored in silos, for example, which often include specially adapted outlets including valves and seals, and product can be transferred from one place to another in containers such as intermediate bulk containers, or IBCs, again often having specially adapted outlets.

A problem which has been experienced with handling of this type of product is that of contamination. Product can become contaminated by dust, dirt etc from the outside environment on transfer from one container to another by contact with apparatus surfaces which have been exposed to the outside. Furthermore, the product itself can be a contaminant, where trace residues from shipment of one product remain in the apparatus which is then used for shipment of a different product. Also, traces of material left behind on surfaces exposed to the environment after handling can present an environmental and/or health hazard.

It is an object of the present invention to seek to mitigate problems such as these.

According to the invention there is provided material transfer apparatus, comprising a flow-path for flow of material from a first site to a second site and means for providing a gas stream in the flow-path for removal of material from the flow-path.

The means for providing a gas stream may comprise a nozzle, or a plurality of nozzles operatively connected with a source of gas, and the or each nozzle is preferably directed to provide a as stream normal to the flow-path.

The means for providing a gas stream is itself preferably positioned substantially out of the flow-path and the flow-path may be defined by a wall or walls shaped to promote a toroidal flow of gas therein. Preferably, the flow-path has a substantially circular transverse section, the airstream being provided at a tangent to the circular section of the flow-path.

There may be vent means for escape of gas from the flow-path, and the vent means is preferably positioned at a distance above or below, in use, the means for providing a gas stream. This prevents any vortex effect of the vent from adversely disturbing the toroidal gas stream. The vent means may include gas extraction means.

The apparatus may have valve means for opening and closing the flow-path, the means for providing a gas stream being disposed to provide the gas stream to play on the valve means.

The apparatus may also be provided with seal means of the valve means, the means for providing a gas stream being disposed to provide the gas stream to play on the seal means.

The valve means may comprise a substantially conical or frustoconical element.

In one alternative configuration the flow-path may be defined by together, an outlet of a first container and an inlet of a second container, and the valve means may be disposed to obturate the outlet of the first container. The first container may comprise means for operating the valve means the valve means being raisable into the said one container to open the flow path.

The valve means may include a device to open a closure of the second container.

In an alternative configuration, the flow-path may be defined by together, an outlet of a first container and discharge apparatus adapted to be disposed between the first and a second container. The valve means is preferably a valve of the first container.

The discharge apparatus may comprise a frustoconical hopper, and may also include raisable probe means adapted to engage and raise valve means of the first container.

According to a second aspect of the invention there is provided a method of operating material transfer apparatus comprising a flow-path for transferring material from a first site to a second site, the method comprising the step of providing a gas stream in the flow-path before and/or after flow of product therethrough.

The method may comprise the step of providing the gas stream to play on surfaces of structures located in the flow-path, the structures comprising valve means and/or seal means of the flow-path.

The invention will further be described by way of example and with reference to the following drawings, in which, FIG. 1 is a sectional diagrammatic view of first apparatus embodying the invention;

Figure 1:
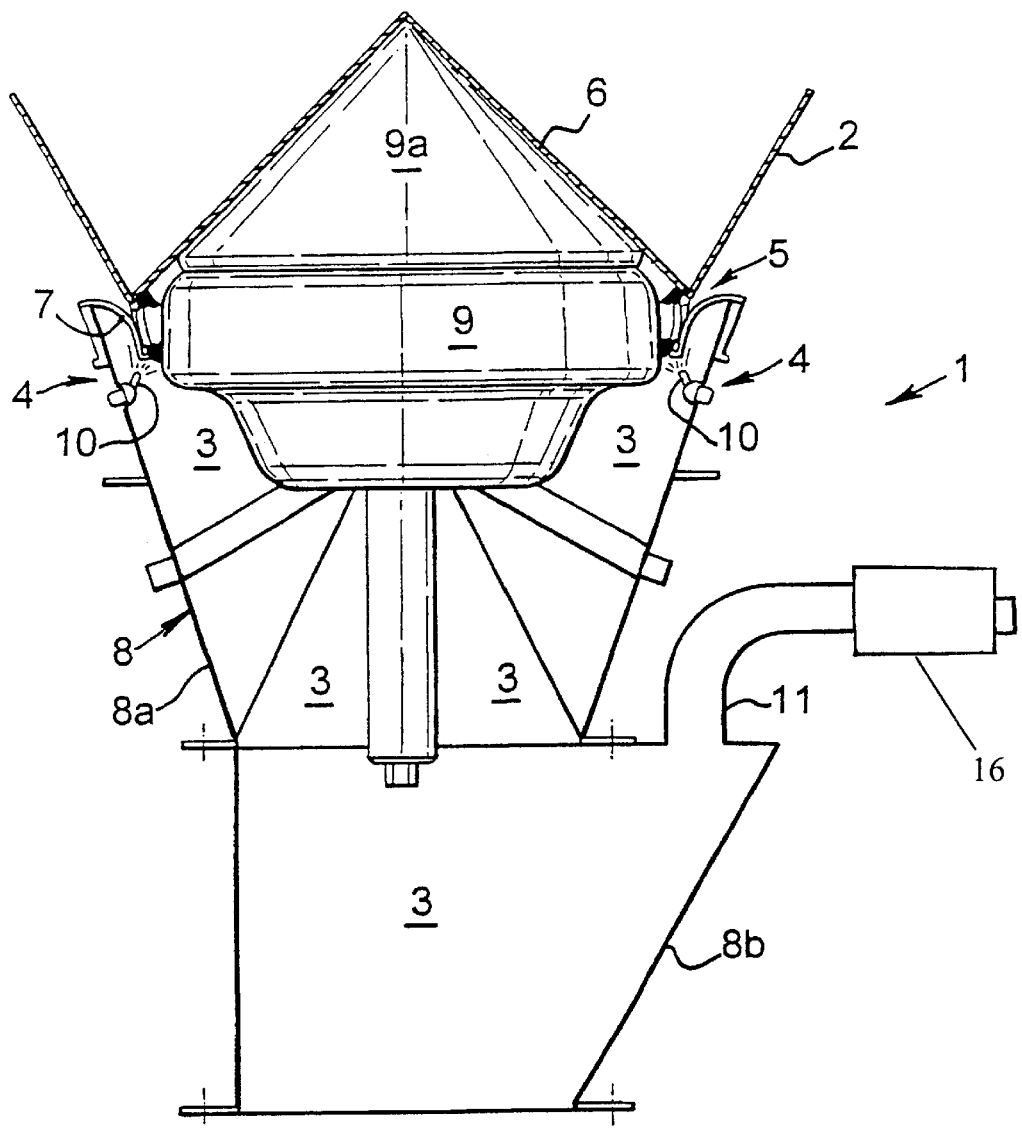

Referring to the drawings, material transfer apparatus 1 comprises a flow-path 3 for flow of material from a first site or container 2 to a second site or container (not shown) and means 4 for providing an airstream in the flow-path 3 for removal of material from the flow-path.

FIG. 1 shows a first form of apparatus 1, in which a first container 2 of known type and usually referred to as an IBC has an outlet 5 including an obturating valve member 6. The valve 6 is of conical configuration and sits in the outlet 5 in the closed position within the periphery or lip of the outlet, as is known in the art. Product in the IBC 2 is delivered by placing the IBC on a discharge station 8 as illustrated. The outlet 5 is received into the upper, in use, end of the discharge station 8 which is provided with a seal 7. The discharge station 8 comprises a frustoconical hopper 8a which defines the flow-path 3 for the product out of the IBC, and includes IBC valve operating apparatus 9. The apparatus 9 comprises a probe 9a and means such as a piston and cylinder or bellows to raise the probe 9a and thus lift the valve 6 from below, clear of the outlet 5 up into the IBC 2. In this way, material can flow down, around the edge of the valve 6 into the hopper 8a and then into for example, a second container or containers for storage or further processing.

The hopper 8a is provided with means for providing an airstream 4 or other gas such as nitrogen in the form of tuyeres or nozzles 10. The nozzles 10 are disposed in the hopper wall and may be spaced evenly therearound, towards the top of the wall (in use) and are directed upwardly, and tangentially relative to the flow-path 3, towards the valve 6 and seals 7. The nozzles 10 are fed via pipework (not shown) with a flow of air controlled manually or automatically by operation of for example suitable valves. A lower section 8b of the hopper 8 has a vent 11, through which air can leave the apparatus. The vent 11 can be connected directly to suitable filter apparatus of known type to remove contaminants, the air moving out of the apparatus 1 by virtue of the air pressure in the hopper 8. Alternatively, the air can be extracted from the hopper 8 via the vent 11 by any suitable means such as, for example, a fan 16.

Figure 2:
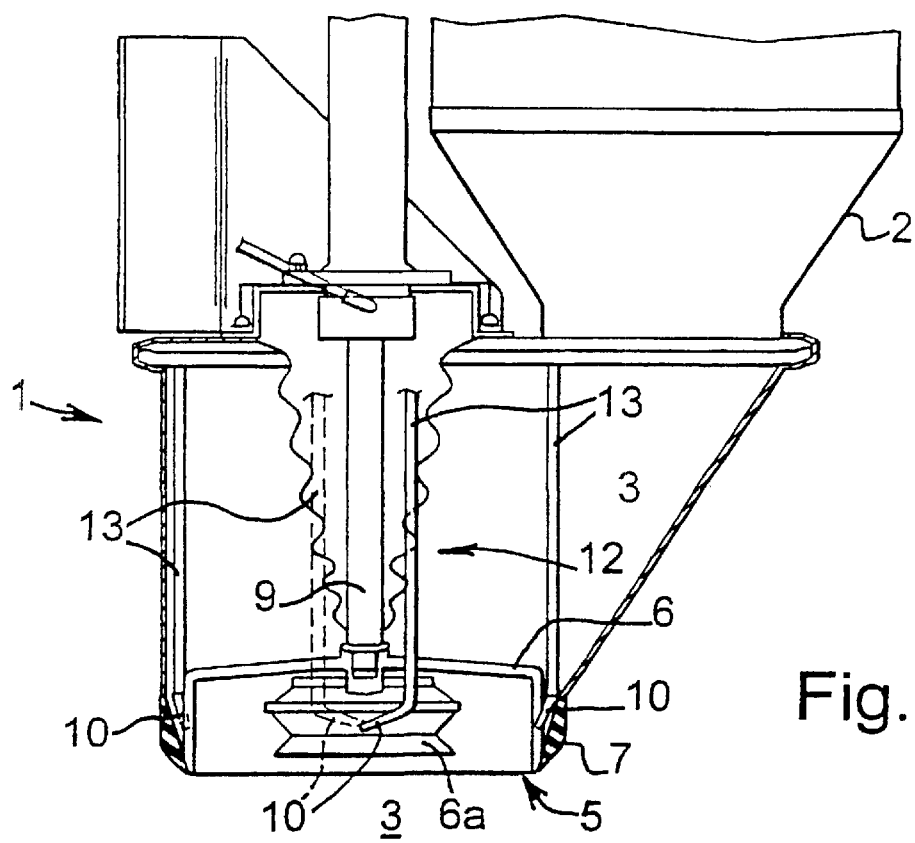
FIG. 2 is a sectional diagrammatic view of second apparatus embodying the invention.

FIG. 2 illustrates an embodiment of the invention in which the flow-path 3 is defined directly by parts of two connected containers, only one of which is shown for clarity. The parts may be shaped to assist in the promotion of a toroidal air stream. The container 2 in this embodiment is for example a storage silo and includes product delivery apparatus 12 which includes a valve member 6 for obturating an outlet 5, and valve operating apparatus 9, which is adapted to lift the valve 6 upwardly into the silo to enable product to flow out around the periphery of the valve 6. As illustrated, there is provided means in the form of a suction cup 6a underneath the valve 6 which is used to remove the cover of a second container so that the delivery operation can be accomplished with the containers sealed together. This apparatus 1 has means for providing an airstream 4 in the flow-path 3 in the form of vertical pipes 13 terminating in nozzles 10 spaced equally around the valve 6. The nozzles 10 are directed towards the surfaces of the valve 6 outlet 5 and seals 7 at the interface between the containers.

Figure 3:
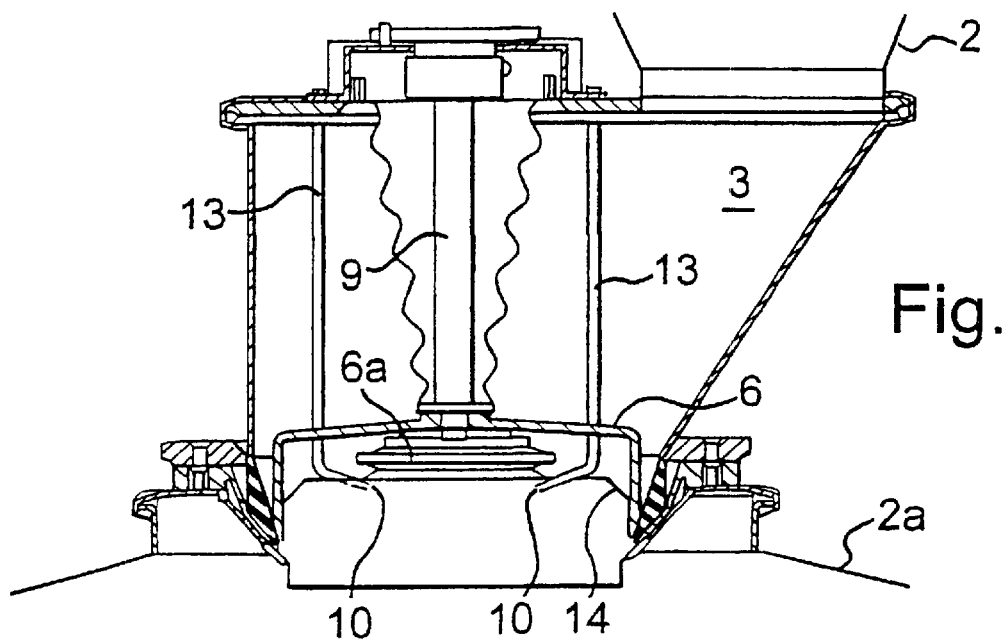
FIG. 3 is a sectional diagrammatic view of third apparatus embodying the invention in a first position.
Figure 4:
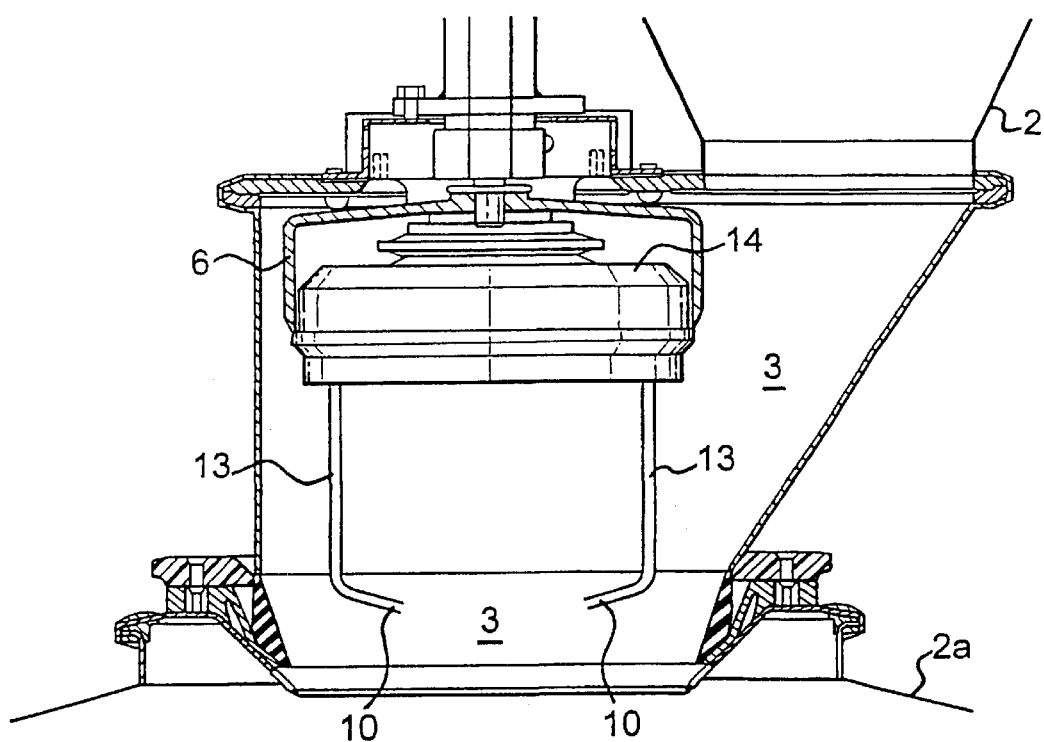
FIG. 4 is a sectional diagrammatic view of the apparatus of FIG. 3 in a second position.

FIGS. 3 and 4 illustrate another embodiment in which the flow-path 3 is defined by parts of two connected containers, both of which are illustrated. The container 2 has a flow path 3 shaped to assist in promotion of a toroidal air flow. The container 2 is similar to that illustrated in FIG. 2, and like parts are illustrated by like reference numerals. The container 2 is illustrated in FIG. 3 with its valve member 6 in the closed position, the container 2 having been lowered onto a second container 2a to which product is to be delivered. The suction cup 6a is attached to the cover 14 of the second container 2a. It will be noted that the pipes 13 extend downwardly to below the level of the top of the valve 6 and terminate in nozzles 10 adjacent the side wall of the valve 6. FIG. 4 illustrates the apparatus of FIG. 3 with the valve 6 in the open position, i.e. raised by means of the suction cup 6a and valve operating apparatus 9. From this view it can be seen that the nozzles 10 are positioned to provide a cleansing air-stream at the mouth of the container 2a.

Each of the embodiments described operates in a similar way, and therefore their operation will be described together. In use, before product delivery is initiated from the first container 2, a stream of air can be supplied via suitable pipework to the nozzles 10, for, say, a burst of 2 minutes or any suitable period which has been determined to effect cleaning. The nozzles 10 thus provide a vortex of cleaning air around the various components so as to remove contaminants such as product residue from the surfaces of these parts. Where the flow-path is of a suitable configuration such as frustoconical, a toroidal flow of air results which assists in cleaning. Where air extraction apparatus is fitted, this too may be operated to assist in residue removal. The air supply (and extraction equipment) can then be shut off, and product delivery commenced. Product flows downwardly around the valve 6 and into, for example, a second container. After product delivery has ceased air can then be introduced again via the nozzles 10 to effect removal of any residual product, or product dust from the surfaces of the valve 6, seal 7 and other surfaces of the equipment. Again, extraction apparatus, if present, can be utilised.

Thus, in all embodiments it can be seen that apparatus according to the invention provides for efficient cleaning of surfaces of equipment to avoid contamination and cross-contamination. The apparatus can be retro-fitted to existing material transfer apparatus to obtain these benefits, as will be apparent to the skilled worker.

What is claimed is:

1. Material transfer apparatus adapted for use with a container having an outlet obturated by a valve comprising a flow-path to a second container that flows material from a first container outlet to a second container inlet having a closure, a valve for opening and closing the flow-path, the valve including a device to open the closure of the second container, the apparatus further comprising means for providing a gas stream in the flow-path for removal of material therefrom.

2. Material transfer apparatus, for transfer of material from a container, the container having an outlet opturated by a valve, the apparatus comprising probe means operable to engage and open the outlet, a flow-path for material flow, and a nozzle operatively connected to a source of gas that provides a gas stream in the flow-path for removal of material therefrom.

3. Apparatus according to claim 2, wherein the means for providing a gas stream is itself positioned substantially out of the flow-path.

4. Apparatus according to claim 2, wherein the flow-path is defined by at least one wall shaped to promote a toroidal flow of gas therein.

5. Apparatus according to claim 2, wherein the flow-path has a substantially circular transverse section, the gas stream being provided at a tangent to the circular section of the flow-path.

6. Apparatus according to claim 2, wherein the gas comprises air.

7. Apparatus according to claim 1, wherein the means for providing a gas stream comprises a nozzle operatively connected to a source of gas.

8. Apparatus according to claim 7, wherein the means for providing a gas stream comprises a plurality of nozzles operatively connected to a source of gas.

9. Apparatus according to claim 7, wherein the nozzle is directed to provide a gas stream normal to the flow-path.

10. Apparatus according to claim 2, wherein the flow-path is defined by together, an outlet of a first container and discharge apparatus adapted to be disposed between the first and a second container.

11. Apparatus according to claim 10, the valve being a valve of the first container.

12. Apparatus according to claim 10, the discharge apparatus comprising a frustoconical hopper.

13. Apparatus according to claim 10, the discharge apparatus comprising raisable probe means adapted to engage and raise valve means of the first container.

14. Apparatus according to claim 2, comprising valve means for opening and closing the flow-path, the means for providing a gas stream being disposed to provide the gas stream to play on the valve means.

15. Apparatus according to claim 14, including seal means of the valve means, wherein the means for providing a gas stream is disposed to provide the gas stream to the seal means.

16. Apparatus according to claim 14, the valve means comprising a substantially conical or frustoconical element.

17. Apparatus according to claim 16, wherein the flow-path is defined by together, an outlet of a first container and an inlet of a second container.

18. Apparatus according to claim 17, wherein valve means is disposed to obturate the outlet of the first container.

19. Apparatus according to claim 18, wherein the first container comprises means for operating the valve means.

20. Apparatus according to claim 18, the valve means being raisable into the said first container to open the flow path.

21. Apparatus according to claim 2, including vent means for escape of gas from the flow-path.

22. Apparatus according to claim 21, wherein the vent means is positioned at a distance above or below the means for providing a gas stream.

23. Apparatus according to claim 21, wherein the vent means includes gas extraction means.

24. A method of operating material transfer apparatus for transfer of material from a container having an outlet opturated by a valve, wherein the apparatus comprises a probe means operable to engage and open the outlet, a flow path for material flow, and a nozzle operatively connected to a source of gas that provides a gas stream in the flow path, the method comprising the steps of engaging the valve with the probe means, opening the outlet with the probe means, providing a gas stream in the flow-path before and/or after flow of material therethrough, for removal of material from said flow path.

25. A method according to claim 24, wherein the step of providing a gas stream comprises using air.

26. A method according to claim 24, comprising the step of providing the gas stream to play on surfaces of structures located in the flow-path.

27. A method according to claim 26, the structures comprising valve means or seal means of the flow-path.

28. Material transfer apparatus comprising a flow-path for flow of material from a first container to a second container wherein the flow-path is defined by together, an outlet of the first container; an inlet of the second container, and means for providing a gas stream in the flow-path for removal of material from the flow-path; a valve means including a device to open a closure of the second container.

* * * * *